United States Patent
Lacaze et al.

(10) Patent No.: US 7,317,998 B2
(45) Date of Patent: Jan. 8, 2008

(54) METHOD FOR THE CALCULATION AND THE ASSESSMENT OF THE FREQUENCY SPECTRUM OF A MATRIX CONVERTER

(75) Inventors: Alain Lacaze, Essert (FR); Massimiliano Visintin, Zurich (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/093,494

(22) Filed: Mar. 30, 2005

(65) Prior Publication Data

US 2005/0222787 A1  Oct. 6, 2005

(30) Foreign Application Priority Data

Mar. 31, 2004  (DE) ................. 10 2004 016 464

(51) Int. Cl.
*G06F 19/00* (2006.01)

(52) U.S. Cl. .................... 702/76; 702/57; 702/60; 702/64; 363/152

(58) Field of Classification Search ............. 702/76, 702/57, 60, 64; 363/148–153, 157, 159, 363/166, 170, 177
See application file for complete search history.

(56) References Cited

U.S. PATENT DOCUMENTS

| | | | | |
|---|---|---|---|---|
| 4,172,991 A | * | 10/1979 | Akamatsu et al. | 318/722 |
| 4,468,725 A | * | 8/1984 | Venturini | 363/160 |
| 4,628,425 A | * | 12/1986 | Venturini et al. | 363/10 |
| 4,648,022 A | * | 3/1987 | Schauder | 363/159 |
| 4,833,588 A | * | 5/1989 | Schauder | 363/159 |
| 4,897,775 A | * | 1/1990 | Klaassens | 363/96 |
| 5,005,115 A | * | 4/1991 | Schauder | 363/159 |
| 5,594,636 A | | 1/1997 | Schauder | 363/160 |
| 5,892,677 A | * | 4/1999 | Chang | 363/152 |
| 5,909,367 A | * | 6/1999 | Change | 363/163 |
| 6,704,215 B2 | * | 3/2004 | Simon | 363/159 |
| 6,711,038 B2 | * | 3/2004 | Ziegler et al. | 363/123 |
| 6,760,239 B2 | * | 7/2004 | Schierling et al. | 363/132 |
| 6,826,065 B2 | * | 11/2004 | Chekhet et al. | 363/159 |

(Continued)

FOREIGN PATENT DOCUMENTS

EP  1 199 794  4/2002

OTHER PUBLICATIONS

Turri et al., De-Synchronized Generator Using a Synchronous Turbo-Generator and a Matrix Converter, Jun. 1-4, 2003, Electric Machines and Drives Conference, ICEMS 2003, Sixth International Conference, vol. 1, pp. 60-66.*

(Continued)

*Primary Examiner*—Carol S. W. Tsai
(74) *Attorney, Agent, or Firm*—Darby & Darby

(57) ABSTRACT

A method for the calculation of an output spectrum of a matrix converter in which m phases of a generator as an input are alternatingly connected via a multiple number of controllable bi-directional switches arranged in an (m×n) matrix with n (n<m) phases of a load as an output. An assessment of the spectrum to be used, for example, for compensation of harmonic distortions of the output spectrum can be obtained by calculating the electromotive force spectrum based on at least one of the connectivity of the phases, on the phase relationship between input and output, and on the instants when commutations of the switches are initiated and on the instants when commutations of the switches are completed.

17 Claims, 5 Drawing Sheets

U.S. PATENT DOCUMENTS

| | | | |
|---|---|---|---|
| 6,856,038 B2* | 2/2005 | Rebsdorf et al. | 290/44 |
| 6,882,550 B1* | 4/2005 | Baumgart | 363/40 |
| 6,900,998 B2* | 5/2005 | Erickson et al. | 363/159 |
| 2002/0093840 A1* | 7/2002 | Lacaze et al. | 363/152 |
| 2003/0137855 A1* | 7/2003 | Miguchi | 363/65 |

OTHER PUBLICATIONS

N. Mohan et al., "Power Electronics", 2nd Edition, John Wiley & Sons, New York, pp. 11-12.

Domenico Casadei et al., "A General Approach for the Analysis of the Input Power Quality in Matrix Converters", Power Electronics Specialists Conference, 1996, vol. 2, pp. 1128-1134.

Stefan Mueller et al., "New Time-Discrete Modulation Scheme for Matrix Convertors", IEEE Transactions on Industrial Electronics, vol. 52, No. 6, Dec. 2005, pp. 1607-1615.

Stefan Mueller et al., "New Modulation Strategy for a Matrix Converter with a Very Small Mains Filter", Power Electronics Specialist Conference, 2003, vol. 3, pp. 1275-1280.

* cited by examiner

METHOD FOR THE CALCULATION AND THE ASSESSMENT OF THE FREQUENCY SPECTRUM OF A MATRIX CONVERTER

Priority is claimed to German Patent Application No. 10 2004 016 464.9, filed on Mar. 31, 2004, the entire disclosure of which is incorporated by reference herein.

The present invention relates to the field of power electronics and in particular to power generation with a synchronous generator which is operated above the synchronous mains frequency, as well as the drive of variable-speed synchronous motors and induction motors.

The invention relates more specifically to a method for the calculation and the assessment of the frequency spectrum of a matrix converter in which m phases of a generator generating alternating voltage with n (n<m) phases of a load are alternatingly connected via a multiple number of controllable bi-directional switches arranged in an (m×n) matrix.

BACKGROUND

In power generation, at a specified output, an increase of the rotary speed of a turbine is associated with a decrease in size and costs. Efficiency, too, can be improved. Already, power generation turbines up to 70 MW are connected to generators by way of gearing arrangements, so as to allow operation at higher rotary speeds. As the output increases, the use of gearing arrangements becomes increasingly difficult for safety reasons. In such cases, the turbine is operated at synchronous speed.

The use of a gearing arrangement is associated with a number of disadvantages, such as a fixed transmission ratio, a noise level above 100 dB for 40 MW, and above 115 dB for 70 MW, mechanical losses irrespective of the particular load, and exacting requirements with regard to cooling and lubrication with oil.

The use of static frequency converters (power electronics) represents an alternative. Among others, the following advantages could be expected: reduced costs of the generator in agreement with a constant product of volume and rotational speed, a standardized generator for both 50 and 60 Hz, an adjustable speed which allows restoration of the partial-load efficiency of the turbine, reduced losses in relation to the gearing arrangement (at least in partial load), no upper limit of the possible output, and use of the generator as a starter motor (in the case of gas turbine applications).

Both in the case of power generation and in the case of drives, a reduction in losses of the static frequency converters would bring about substantial cost savings. A reduction of the losses would above all have a bearing on investment costs because cooling accounts for a substantial part of the total costs of the converter.

Static frequency converters exist both with indirect AC/DC/AC conversion and with direct AC/AC conversion.

The indirect conversion (AC/DC/AC) is caused by generating a directed direct current or a directed direct voltage from the three-phase source (mains in the case of motors; generator in the case of power generation). Subsequently, the direct current or the direct voltage is converted back to an alternating current by means of an inverter.

An inductance (current converter) or a capacitor bank (voltage converter) are switched into the intermediate circuit so as to reduce the ripple component of the current or the spikes.

These days, converters make use of thyristors. If natural commutation of the thyristors is possible, the losses in the converter are reduced. However, induction motors for example, take up reactive power. In order to make this reactive power from the net available, it should be possible to switch off the current in a specified arm of the converter at any desired time. In this case there is forced commutation and thus there are increased losses.

Voltage converters use GTOs with their inherent high switching losses, as well as IGBTs or IGCTs. The power of the individual components is less than that of thyristors, consequently, a larger number of components are required for a specified voltage or a specified current.

Direct conversion (AC/AC) is for example possible by means of a so-called cyclo-converter. Direct conversion provides significant advantages from the point of view of the electrical machine, because the current is more or less a sine-shaped wave rather than chopped direct current. It reduces the losses which occur additionally within the electrical machine and it also prevents pulsating torques.

However, the use of cyclo-converters limits the achievable frequency range to 0-⅓ of the input frequency. Due to imbalanced operation, exceeding the ⅓ limit results in overdimensioning up to a factor of 3.

Another possibility of direct conversion is provided by a so-called matrix converter in which each phase of a multi-phase source (generator or mains) is connected or connectable with each phase of a multi-phase load (mains, passive load, motors, etc.) by a bi-directional switch (see e.g. N. Mohan et al., Power Electronics, 2nd Edition, John Wiley & Sons, New York pp. 11-12). The switches consist of an adequate number of thyristors to withstand the differential voltage between the phases, and the phase currents, and to allow current reversal. They can be regarded as truly bi-directional components with the options of jointly using additional wiring such as snubbers or the power supplies for the drive pulses for the antiparallel components.

The switches are arranged in a (m×n)-matrix at m phases of the source and n phases of the load. This provides the option of establishing any desired connections between the input phases and the output phases; however at the same time it has the disadvantage in that certain switching states of the matrix must not be allowed since otherwise for example a short circuit would result. Furthermore, it is desirable to carry out commutation from one phase to another phase such that the lowest possible switching losses result.

U.S. Pat. No. 5,594,636 describes a matrix converter and a process for its operation in which commutation between the phases is partly carried out as a natural commutation, with a forced commutation where natural commutation is not possible. Although with this type of selection, switching losses are reduced due to natural commutation, those switching losses which arise from forced commutation still remain. Furthermore, the possible forced commutation necessitates the use, in all positions on the matrix, of components which can be switched off. This considerably increases the switching expenditure.

EP-A-1 199 794 describes a matrix converter as well as a method for operating such a matrix converter wherein the essence of the disclosure consists of allowing commutation from one phase to another phase only if such commutation can be carried out as a natural commutation, and of stating a condition for it which can be expressed in a simple way in easily measurable quantities of the matrix converter, and can therefore be easily verified. It therefore takes benefit of a very low commutation frequency, combined with natural commutations, to drastically reduce the commutation loss power. The matrix converter described in this document of the state-of-the-art directly connects the generator phases to the network. Most of the time, three generator phases are connected to the three network phases and only three switches are switched on. Another important characteristic of this converter is to be able to operate with a star connection on the input side. The star point on the generator side should preferably not be grounded through a low impedance. The purpose is actually to improve the overall efficiency. However, a low commutation frequency usually results in a heavy harmonic distortion, which also holds true for the matrix converter as disclosed in EP-A-1199794.

SUMMARY OF THE INVENTION

An object of the present invention is to provide a way for allowing the compensation of harmonic distortions as encountered with static frequency converters, in particular with matrix converters. A further or alternate object of the present invention is to provide a numerical basis for applying compensation or for adapting switching schemes of the converter. A further or alternate object is to provide a method for the calculation of the output spectrum of a static frequency converter in which m phases of a generator as an input are alternatingly connected via a multiple number of controllable bi-directional switches arranged in an (m×n) matrix with n (n<m) phases of a load as an output.

The present invention provides a method for calculating an output spectrum of a matrix converter that includes a calculation of the output spectrum which is based on the connectivity of the phases, on the phase relationship between input and output, and on the instants when commutations of the switches are initiated and/or on the instants when commutations of the switches are completed. To take all frequency components arising into account, such calculation is carried out for at least one real period of repetition of the switching cycle.

The present invention provides a method for the calculation of the output spectrum of a matrix converter in which m phases of a generator as an input are alternatingly connected via a multiple number of controllable bi-directional switches arranged in an (m×n) matrix with n (n<m) phases of a load as an output characterized in that calculation is based on the connectivity of the phases, on the phase relationship between input and output, and on the instants when commutations of the switches are initiated and on the instants when commutations of the switches are completed, wherein such calculation is carried out for at least one real period of repetition of the switching cycle. In addition, the present invention provides uses of such a method and a computer program product for calculating a spectrum according to the method.

One feature of the invention is the fact that apparently the electromotive force spectrum of a static frequency converter, in particular of a matrix converter can be calculated without any voltage, current or impedance being absolutely known. While, of course the voltage spectrum could be obtained from a Fourier analysis of the output voltage, which is cumbersome, the proposed method allows a quick and easily adaptable method for an assessment of the output spectrum which basically only relies on information on the commutation instants.

Surprisingly, it can be shown that the use of the electromotive force spectrum as simulated based on the effective switching times and switching instants (due to the delay between the initiation of the commutation and the effective switching off of the corresponding switch after its initiation) allows a much more efficient means for assessment of improvements of the system e.g. by means of compensation voltages or by means of adapted commutation schemes. While if using the real output spectra only partial compensation or cancellation of deleterious harmonic components is possible, the use of the calculated electromotive force spectrum allows the system to be influenced at the very root of the cause leading to the harmonic distortions.

According to the first preferred embodiment of the present invention, the electromotive force spectrum is calculated, wherein preferably this spectrum is used to predict the voltage spectrum and/or the current spectrum and/or the power spectrum.

According to another preferred embodiment, the instants when the commutations of the switches are initiated and in particular when the commutations are effectively completed are determined by monitoring and/or measuring the individual switches in the converter. As a matter of fact, it is, among other reasons, these delays due to non ideal behaviour of the switching process, leading to harmonic distortions. So preferentially the EMF spectrum is calculated taking these real values of the timing of the switches into account.

According to another preferred embodiment, the static frequency converter is a matrix converter, in which n phases of the generator are always connected with the load while (m−n) phases of the generator are not connected with the load, wherein switching over from a selected connected phase of the generator to a selected non-connected phase of the generator only takes place if the condition $$I_k \cdot (V_k - V_l) \cdot K_{ijkl} <$$

is met, where $I_k$ and $V_k$ is the current and the voltage of the selected connected phase $V_l$ is the voltage of the selected non-connected phase and in each instance $K_{ijkl}$ is a characteristic constant for the mutual inductance between the phases of the generator and the inductance of the load. Basically, this means that the calculation is carried out for the system according to the above-mentioned document of the state-of-the-art EP-A-1199794. The disclosure of this document of the state-of-the-art is explicitly included into this specification as concerns the method of operation of such a matrix converter. Correspondingly, the switching state of the switches, the connection state of the phases of the generator, and the signs of the currents in the phases of the generator, and the differential voltages between the phases of the generator, are monitored or measured. The commutation scheme is carried out such that at specified preferably periodic points in time switch-over occurs, and that for switch-over one or several phases of the generator are selected, which phases of the generator according to the information gained from monitoring or from measuring, are not connected and fulfill the conditions. Preferably, antiparallel thyristors are used as bi-directional switches.

The present invention furthermore relates to preferred uses of the above-mentioned method for the improvement of the spectrum generated by a static frequency converter, preferably a matrix converter. In the first use, compensation voltages are determined based on the calculated electromotive force spectrum. In this case, preferably compensation voltages are added online to the converter output and/or the converter input and/or are provided internally in the converter, wherein the added voltages are determined based on the calculated spectrum. The compensation voltages can be generated in various ways; preferably the compensation voltages are generated from an auxiliary frequency converter and an auxiliary source and/or from the main inlet source in combination with an auxiliary converter, and/or from the outlet in combination with an auxiliary converter.

Interestingly, if such compensation is based on an actual measurement of the true frequency spectrum generated by the converter and by adding a corresponding compensation voltage based on this measured frequency spectrum, this can, in the presence of big inductances, not lead to a full compensation of the harmonic distortions. Generally using a measured output spectrum leaves about one third of the harmonic distortions still present in spite of compensation voltages based on this measured spectrum. The proposed use of the electromotive force spectrum is therefore enormously advantageous. The simulated electromotive force spectrum will only give a normalized value of the compensation necessary, but subsequent scaling for adapting to the real output situation can easily be effected. While, if calculation is carried out based on the above information only (which phases are connected, instants when commutations started, instants when commutations are completed, phase relationship) only a normalized spectrum can be obtained, an absolute spectrum can be obtained if additionally the calculation is based on the input voltage and/or on the input current.

According to a first preferred embodiment of this use, the addition is effected on each of the m phases of the generator if the voltages are added on-line to the converter input, and that the correction is effected on each of the n phases of the generated alternating voltage if the voltages are added on-line to the converter output.

Another preferred use of the above-mentioned method is possible for the improvement of the spectrum generated by a static frequency converter, preferably a matrix converter, Thereby the commutation scheme of the frequency converter is iteratively adapted based on the calculated electromotive force spectrum.

It has to be noted that also a combined use is possible, i.e. concomitantly or sequentially adapting the commutation scheme and adding compensation voltages for highly efficient suppression of unwanted frequency components.

Both of these advantageous uses of the calculation method, either the use for compensation voltages or for adapting the commutation scheme is preferentially carried out in an iterative improvement scheme by means of repeatedly: 1. calculating electromotive force spectra according to the momentaneous conditions and 2. subsequent adaptation of the influence on the output spectrum.

Additionally, the present invention relates to a computer program product for calculating a spectrum according to a method as mentioned above, preferably for a use as mentioned above.

Further embodiments of the present invention are outlined in the claims.

BRIEF DESCRIPTION OF THE DRAWINGS

In the accompanying drawings preferred embodiments of the invention are shown, in which.

DETAILED DESCRIPTION

Without limiting the scope of the invention, the following detailed description of the preferred embodiments shall focus on the application of the inventive method for the calculation of the output spectrum of a static frequency converter in particular the application to a matrix converter as disclosed in EP-A-1199794 shall be demonstrated. The purpose here is to show that the harmonic distortion can be predicted in terms of:

the frequency spectrum, which is generally possible with any static frequency converter phase and amplitude, which may be cumbersome with other static frequency converters.

The second purpose is to explain how the prediction of spectrum can be used to control harmonic distortion.

The voltage and the current spectrum as well as indirectly the power spectrum of a matrix converter in general all depend on the effective electromotive force (EMF) and on the effective impedance on each harmonic. These impedances and electromotive forces strongly depend on the frequency, on the whole circuit and on the specific commutation sequence.

Generally, one can say, that the voltage (V) and the current (I) spectrum are cumbersome and complicated to predict.

Quite on the contrary, the effective electromotive force EMF can be predicted from a limited number of information, as shall be shown below.

Figure 1:
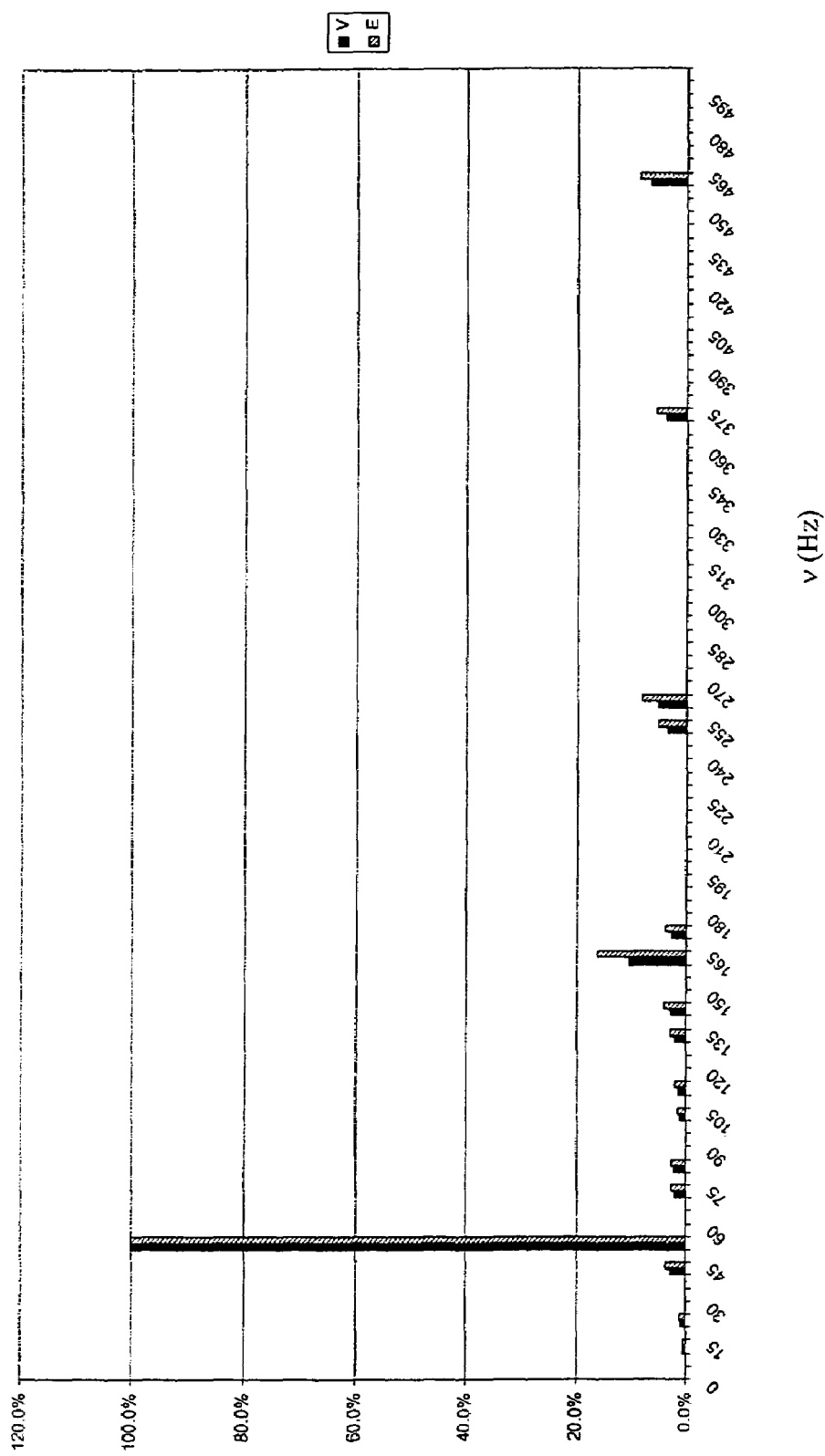
FIG. 1 displays a spectrum of a matrix converter according to the state-of-the-art, wherein the intensity of the output voltage (normalized) is displayed as a function of the frequency (solid bars), and wherein the electromotive force (normalized) as calculated is displayed as a function of the frequency (hatched bars)

As an example the spectrum displayed in FIG. 1 shows a comparison of the actual voltage spectrum (solid bars) and a theoretical assessment of the electromotive force spectrum (hatched bars).

One should evaluate the fit in amplitudes, see FIG. 1, in view of the fact that the impedance of harmonics is mostly inductive, therefore increases with frequency. A comparison of the phase of the harmonics also gives a reasonable fit to the expected values.

The main discrepancy between these two spectra (actual voltage spectrum and theoretical calculated electromotive force EMF spectrum) is the means used to obtain amplitudes and phases:

The voltage spectrum is obtained from a Fourier analysis of the output voltage.

The electromotive force EMF spectrum is computed without any voltage, current or impedance being known. The only information which is used relates to the commutation instants.

Therefore the relative amplitudes of the electromotive force acting on each harmonic can be predicted from simple, easy to obtain information which is:

Which phases were connected

The instants when commutation started

The instants when commutations were completed

The initial value of the phase relationship between input and output.

If no information on the amplitude of the input voltage is available, only a normalized spectrum can be assessed. This is sufficient, because only the relative amplitude and phases are needed, but not the absolute ones.

Since for the harmonic distortions among other reasons the delay between the instant a certain switch is initiated to turn off and the instant the next switch effectively takes over and connects another branch of the matrix converter, is important, taking the effective conditions of this switching as realistically into account as possible is important. Therefore for the calculation the following scheme is used:

1. Determine the real period of repetition of the full commutation cycle. Subsequently any calculation will have to be carried out for at least one such real period to make sure all frequency components are effectively taken account of.
2. Identify when the individual switches are turned on and turned off within the commutation cycle. These parameters (on/off of each switch) should not only be determined theoretically (by means of the commutation scheme programmed and controlled by a control software), but as they actually take place, i.e. the instants when switches are effectively turned on and/or off are monitored and measured, and these measured instants are taken for the calculation of the EMF spectrum.
3. Calculate the EMF spectrum based on the connectivity of the phases, on the phase relationship between input and output, and on the instants when commutations of individual switches are initiated (on, measured/monitored) and on the instants when commutations of individual switches are completed (off, measured/monitored), wherein such calculation is carried out for at least one real period of repetition of the switching cycle Since there is a delay (actual duration of commutation) between the moment $t_1$, when phase a is disconnected via a switch $g_1$ ($g_1$ turns off) and the moment $t_2$, when the next phase b is connected via another switch $g_2$ ($g_2$ turns on), the behaviour during this delay is taken account of in the calculation by using an average linear value. This average value is determined by the amplitude of the respective phases when switched on/off, respectively, and by the amplitude of the crossing of the two phases. I.e. during the actual duration of commutation a linear behaviour of the amplitude is used, including the amplitude of the crossing of a and b and with a slope given by the difference of the amplitude of a at $t_1$ and of b at $t_2$.

The above method for calculating the EMF spectrum of a static frequency converter can be used for the compensation of harmonic distortions of the output of the frequency converter:

In principle the electromotive force derived from the status of commutations can be used to try to cancel the harmonic distortion.

Figure 2:
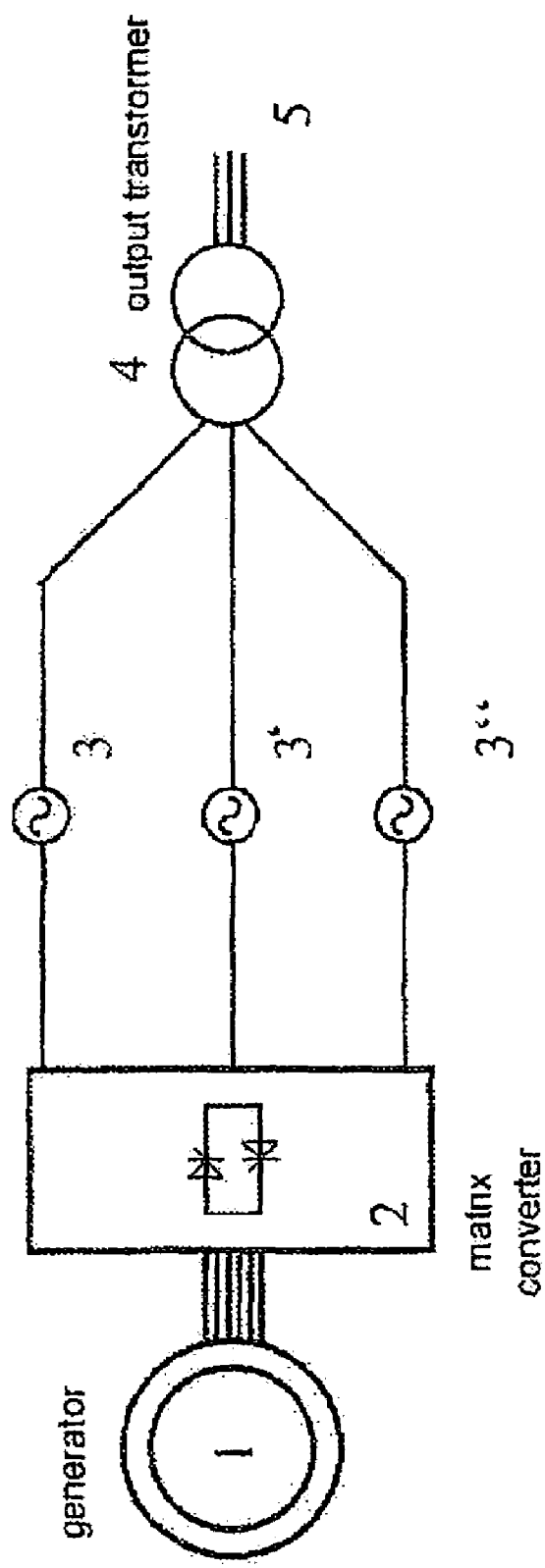
FIG. 2 displays a schematic drawing of a set-up allowing the application of compensation voltages based on the calculation method according to the invention.

The calculated electromotive force spectrum, even though only relative amplitudes are obtained, can be used to define compensation voltages. The compensation voltages can be added to the three output voltages of a matrix converter 2, as shown in FIG. 2, wherein there is a generator 1, the matrix converter 2, and output transformer 4 and a load 5 in the form of a grid. The output phases 3 also indicated.

Alternatively, the compensation voltages can be applied on the input of the converter but then more phases have to be supplied, and the compensation voltage waveform is more cumbersome to define.

The harmonic distortion compensation strategy is:
Assess the relative amplitudes and phases from the commutation status
Select the harmonics to be reduced, and the reduction rate,
Define the three compensation voltages
Apply the compensation voltages
Iterate, if needed, and preferably periodically recalculate and optimize since there is always changes of the condition of the grid, the load, the system etc.

The electromotive force spectrum based compensation will drastically reduce the harmonic current. Therefore the voltage and current after the output transformer will exhibit very low distortion.

It has to be pointed out that compensation using a Fourier transform of the effective output spectrum in particular in case of large inductances will not lead to proper cancellation of the distortions, while the use of the EMF spectrum does.

An additional benefit of the cancellation of the harmonic current is to avoid harmonic distortion toward the source (converter inlet).

Figure 3:
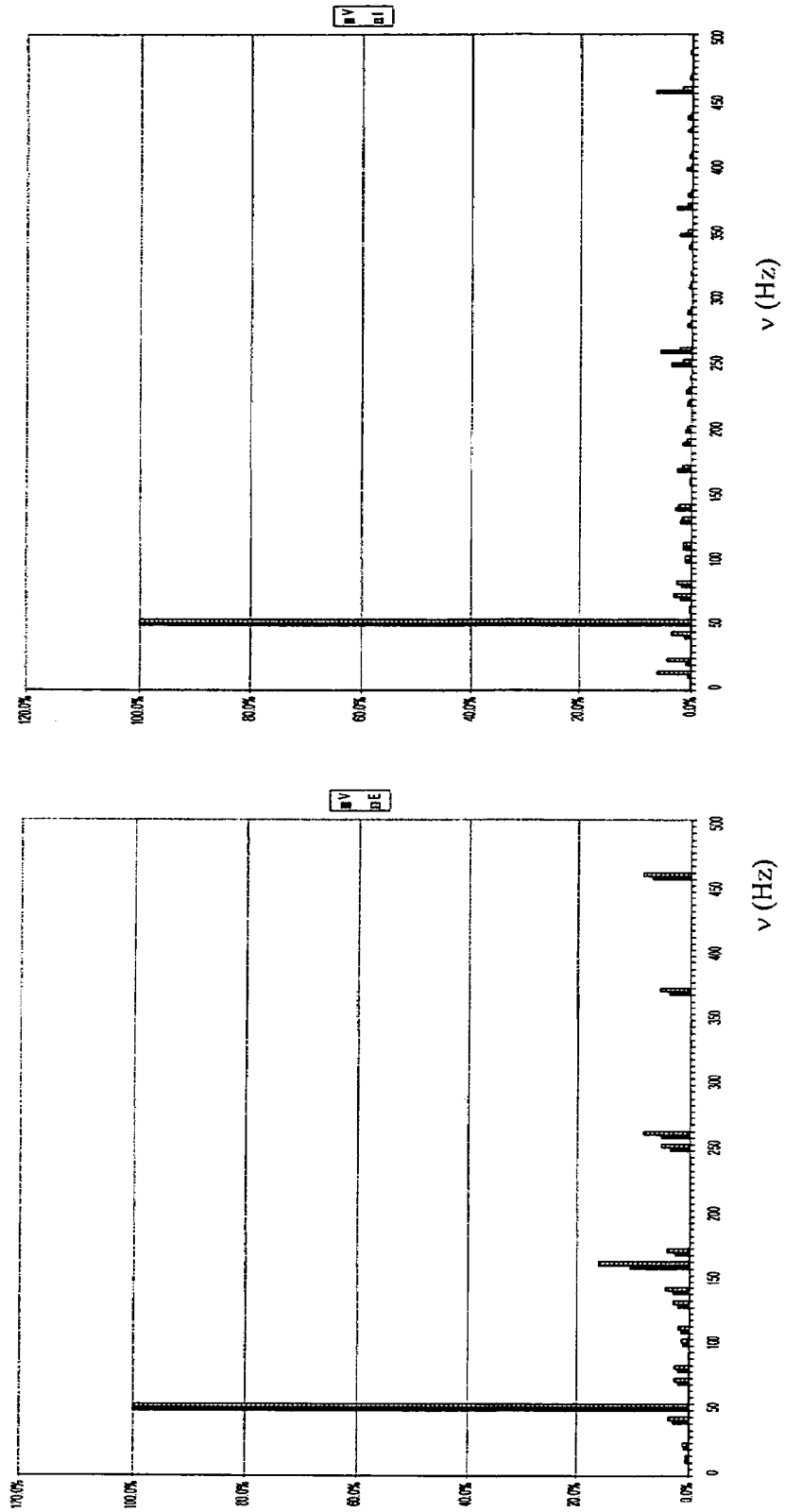
FIG. 3 shows a) the voltage (hatched bars) and current (solid bars) spectrum without compensation; b) the voltage (solid bars) and current (hatched bars) spectrum with full compensation at 160 Hz and part compensation at 40 Hz.

Harmonic distortion compensation example:

The spectrum of FIG. 3 shows voltage and current harmonics when the component at 160 Hz is fully cancelled and the component at 40 Hz is partly cancelled. FIG. 3a) shows the spectrum without any compensation, FIG. 3b) shows the spectrum with compensation. Compensation voltages were defined according to the here-explained method.

The compensation is selective. One can specify the harmonics to be compensated and the level of compensation. The electromotive force evaluation is coarse when the harmonic current is large. The evaluation gets more and more accurate as the harmonic current reduces. Also, when the compensation becomes effective, i.e. current waveform is affected (improved). The change in current waveform results in a different commutation duration. As a consequence the electromotive force itself is modified. An iterative process may be required.

Figure 4:
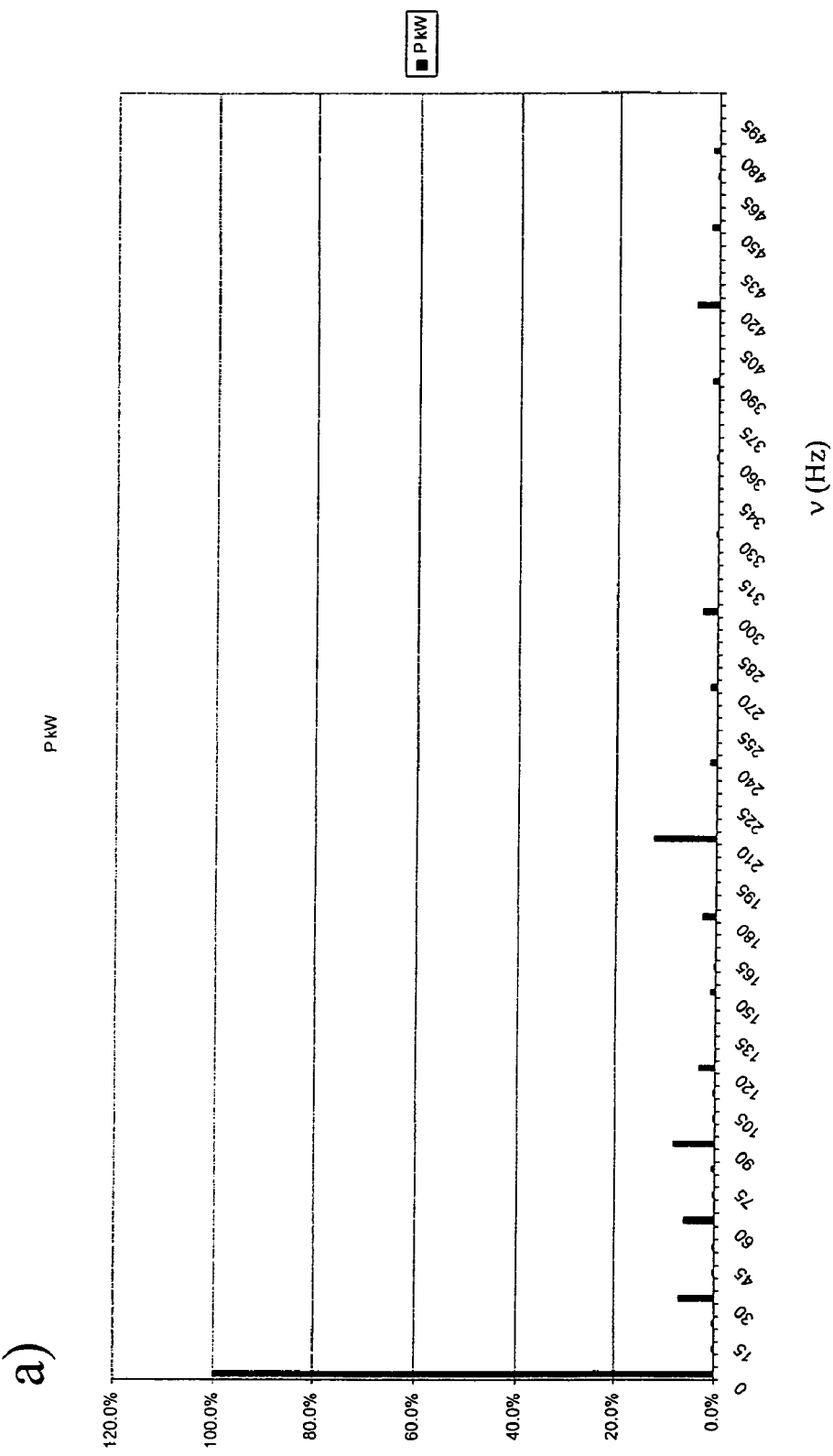
FIG. 4 a) power spectrum with compensation; b) power spectrum without compensation.
Figure 4:
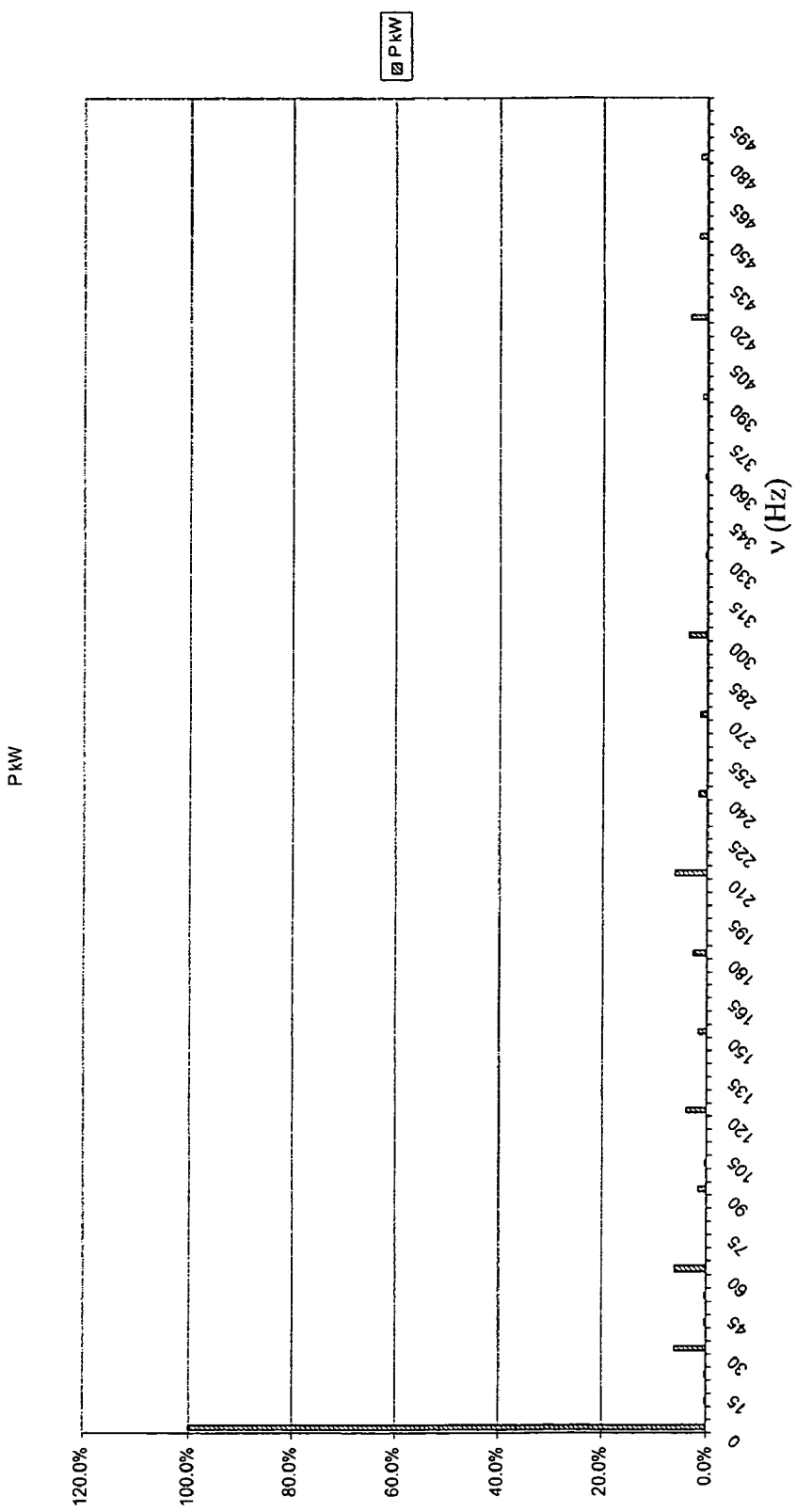

On the power spectrum plot on FIG. 4, one can see that the 90 Hz and 210 Hz harmonic amplitude are drastically reduced when the compensation voltages are applied. FIG. 4a) shows the compensated spectrum, while FIG. 4b) shows the spectrum without compensation.

The spectrum of power gives information on the torque, i.e. on the harmonic distortion toward the input of the converter.

The compensation voltages can be produced in different ways. One possibility is that the compensation voltage is provided from the inlet source (high frequency). Further possibilities are from the outlet (lower frequency), from an auxiliary source (any frequency) or even internally in the converter.

Except when they are produced internally in the converter, the compensation voltages are shaped by an auxiliary low power converter. Converters of any kind may be used; a matrix converter similar to the main converter is preferred.

Except when they are produced internally in the converter, the compensation voltages can be applied through a transformer. This transformer can be three single phase or one three-phase transformer. It can be an auxiliary winding on the outlet transformer.

A similar procedure allows to apply voltages on the inlet instead of the outlet of the converter.

To summarize, the specifics of the harmonic distortion cancellation concept are as follows:

1. Only the voltage spectrum is primarily intended to be controlled. Current is expected to exhibit an improved spectrum because the electromotive forces which generates the harmonic currents are cancelled.
2. The current and voltage after the outlet transformer will both have a high quality spectrum.
3. The electromotive force spectrum is derived from the instants when switches are turned on and/or off, and these instants are derived from measurement or monitoring.

4. A compensation voltage is defined from this electromotive force spectrum.
5. The compensation voltages are generated alternatively or in combination as follows:
   a) from an auxiliary frequency converter and auxiliary source
   b) from the main inlet source also using an auxiliary converter
   c) from the outlet still also using an auxiliary converter
   d) internally in the converter.
6. The power involved in the compensation is substantially lower than the main processed power.

The expected benefits are among others:
1. Simple and fast method to define the compensation voltages.
2. Very little information needs to be known to define the compensation voltages.
3. Both inlet and outlet harmonic distortion is improved by the same process.
4. Additional hardware costs are limited. Anyhow, filtering means are no longer useful. Derating of rotating machine is avoided as well.

The proposed method may also be used for improvement of the commutation scheme, in order to avoid deleterious harmonics. To this end, the EMF spectrum is calculated for a given commutation sequence, and subsequently the sequence is iteratively improved to eliminate the unwanted harmonics, e.g. by checking the influence of individual switching processes or groups of switching processes on certain unwanted harmonics.

What is claimed is:

1. A method for calculating an electromotive force output spectrum of a matrix converter, comprising:
   alternatingly connecting m phases of a generator as an input with n phases of a load as an output using a plurality of controllable bi-directional switches arranged in an (m×n) matrix, wherein n>m;
   calculating the electromotive force output spectrum based on at least one of a connectivity of the phases, on a phase relationship between input and output, and on instants when commutations of the switches are initiated and when the commutations of the switches are completed; and
   carrying out the calculating for at least one real period of repetition of a switching cycle.

2. The method as recited in claim 1, wherein the calculation is additionally based on at least one of an input voltage and an input current.

3. The method as recited in claim 1, further comprising predicting at least one of a voltage spectrum, a current spectrum, a power spectrum using the electromotive force spectrum.

4. The method as recited in claim 1, further comprising determining at least one of the instants when the commutations of the switches are initiated and when the commutations are effectively completed by at least one of monitoring and measuring individual ones of the plurality of controllable hi-directional switches.

5. The method as recited in claim 1, wherein n phases of the generator are always connected with the load and (m−n) phases of the generator are not connected with the load, wherein a switching over from a selected connected phase of the generator to a selected non-connected phase of the generator only takes place if the condition $$I_k \cdot (V_k - V_l) \cdot K_{ijkl} > 0$$

is met, where $I_k$ and $V_k$ is the current and the voltage of the selected connected phase, $V_l$ is the voltage of the selected non-connected phase and in each instance $K_{ijkl}$ is a characteristic constant for the mutual inductance between the phases of the generator and the inductance of the load.

6. The method as recited in claim 5, further comprising at least one of monitoring and measuring a switching state of the switches, a connection state of the phases of the generator, signs of the currents in the phases of the generator, and differential voltages between the phases of the generator; performing a switch-over at specified points in time; and selecting one or more phases of the generator for the switch-over, wherein the one or more phases are selected using information from the at least one of monitoring and measuring, are not connected, and fulfill a predetermined condition.

7. The method as recited in claim 6, wherein the switch-over is performed at periodic points in time.

8. The method as recited in claim 1, wherein the bi-directional switches include antiparallel thyristors.

9. A method for improving an electromotive force output spectrum generated by a static frequency converter, the method comprising:
   alternatingly connecting m phases of a generator as an input with n phases of a load as an output using a plurality of controllable bi-directional switches arranged in an (m×n) matrix, wherein n>m;
   calculating an electromotive force spectrum based on at least one of a connectivity of the phases, on a phase relationship between input and output, and on instants when commutations of the switches are initiated and when the commutations of the switches are completed;
   carrying out the calculating for at least one real period of repetition of a switching cycle; and
   determining compensation voltages based on the calculated electromotive force spectrum.

10. The method as recited in claim 9, wherein the static frequency converter includes a matrix converter.

11. The method as recited in claim 9, further comprising adding the compensation voltages online to at least one of an input, an output, an internal portion of the converter.

12. The method as recited in claim 9, further comprising generating the compensation voltages using an auxiliary frequency converter.

13. The method as recited in claim 12, wherein the generating is performed using the auxiliary frequency converter together with one of an auxiliary source, the main inlet source, and the outlet.

14. The method as recited in claim 11, wherein the adding of the compensation voltages is performed on each of the m phases of the generator if the voltages are added on-line to the converter input, and is performed on each of the n phases of the generated alternating voltage if the voltages are added on-line to the converter output.

15. The method as recited in claim 9, wherein further comprising iteratively adapting a commutation scheme based on the calculated electromotive force spectrum.

16. The method as recited in claim 9, further comprising:
   repeatedly calculating electromotive force spectra according to momentaneous conditions;
   subsequently adapting an influence on the output spectrum in an iterative maimer.

17. A computer readable medium having stored thereon computer executable process steps operative to perform a method for calculating a spectrum according to the method as recited in claim 1.

* * * * *